(12) United States Patent
Anand et al.

(10) Patent No.: US 7,469,375 B2
(45) Date of Patent: Dec. 23, 2008

(54) SYSTEMS AND METHODS FOR MANAGING ERROR DEPENDENCIES

(75) Inventors: Ashok Anand, New Delhi (IN); Amitkumar M. Paradkar, Mohegan Lake, NY (US); Donald P. Pazel, Montrose, NY (US); Beth R. Tibbitts, Lexington, KY (US); Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 11/037,694

(22) Filed: Jan. 18, 2005

(65) Prior Publication Data
US 2006/0161903 A1    Jul. 20, 2006

(51) Int. Cl.
G06F 11/00    (2006.01)
G08C 25/00    (2006.01)

(52) U.S. Cl. ......................................... 714/799; 714/49
(58) Field of Classification Search .................... 714/49, 714/799
See application file for complete search history.

(56) References Cited

U.S. PATENT DOCUMENTS

| | | | |
|---|---|---|---|
| 5,535,121 A * | 7/1996 | Roche et al. ................. | 704/9 |
| 6,115,544 A * | 9/2000 | Mueller ....................... | 714/57 |
| 6,205,565 B1 * | 3/2001 | Bissett et al. ................ | 714/49 |
| 6,971,096 B1 * | 11/2005 | Ankireddipally et al. .... | 718/101 |
| 2002/0116205 A1 * | 8/2002 | Ankireddipally et al. ..... | 705/1 |

* cited by examiner

*Primary Examiner*—M. Mujtaba K Chaudry
(74) *Attorney, Agent, or Firm*—Ference & Associates LLC

(57) ABSTRACT

Methods and arrangements for managing error messages from a set of programming tools within a program development environment, such as compilers, linkers, library builders, etc. The error messages are arranged as a directed acyclic graph, with the nodes as error messages, and edges as dependency relationships. In accordance with at least one presently preferred embodiment of the present invention, there are broadly contemplated the following: allowing one or more programming tool to report errors to an error manager component; deducing dependencies amongst error messages, based on error dependency definition provided to the error manager; and delivering messages and dependencies to client components. Although framed within the context of program development tools, this solution could be applied to many other tools outside this domain, under suitable and specified requirements.

13 Claims, 4 Drawing Sheets

SYSTEMS AND METHODS FOR MANAGING ERROR DEPENDENCIES

FIELD OF THE INVENTION

The present invention relates generally to program development tools and, more particularly, to arrangements for structuring error messages reported by various program development tools.

BACKGROUND OF THE INVENTION

In the realm of error messages, using compilation as an example, errors found by a compiler are typically reported without regard to other, possibly related, errors already detected. Consequently, the errors can be reported in an unstructured manner, making the task of fixing the errors very cumbersome. For example, suppose a class FOO defines a field f, and that FOO is not defined in the program. Typically, all uses of the field f are flagged as errors. These would not be errors only if FOO were defined. However, the user must filter through all these errors and others to determine that there are not many problems, but only one, namely the need for the class definition of FOO.

Generally, error reports from program development tools are typically a tangled web of unstructured information, from which the user must both filter and deduce the principal error origins, and address those in the application build. In many cases, errors are a result of others, and so are secondary errors to one or more primary errors. In some cases the connection is clear; in others not.

As an example from C++, when an included file cannot be found by the compiler, not only is that an error, but all uses of program artifacts defined in the missing include file are errors as well. While it is not clear which missing file accounts for each undefined artifact, most if not all of these errors are dependent on the array of missing includes.

Another example from C++ is in the use of out-of-scope variables. When one codes a "for loop" such as for(int i=0; i< ... ; ... )

the scope of variable i is totally within the body of the loop. So, uses of i outside the "for loop" but within the scopes that the "for loop" is within would be flagged as an error, independent of the error on the "for loop". Seeing the latter error as dependent on the former would be of great use in focusing on the true cause of the error without being distracted by somewhat superfluous error messages.

In view of the foregoing, a need has been recognized in connection with making the error reporting aspect of programming development tools both more user friendly and more effective generally.

SUMMARY OF THE INVENTION

In accordance with at least one presently preferred embodiment of the present invention, there is broadly contemplated the recordation of dependencies amongst errors when possible and to report not just the error, but the dependencies. In this manner, the user may become more inclined to fix problems that are more causal in relationship to others, and thus filter to primary errors. It is also broadly contemplated herein that all the tools within a development environment be surveyed or looked at in relationship to each other, to thereby causally relate the errors produced from one tool to those of another, providing the end user with a deeper semantic view of the errors reported during development and build cycles.

In at least one presently preferred embodiment, the present invention provides a method and apparatus to manage error messages from a set of programming tools within a program development environment, such as compilers, linkers, library builders, etc. The error messages are arranged as a directed acyclic graph, with the nodes as error messages, and edges as dependency relationships.

Proceeding further, in accordance with at least one presently preferred embodiment of the present invention, there are broadly contemplated the following:

allowing one or more programming tool to report errors to an error manager component;

deducing dependencies amongst error messages, based on error dependency definition provided to the error manager; and delivering messages and dependencies to client components.

Although framed within the context of program development tools, the above solution could be applied to many other tools outside this domain, under suitable and specified requirements.

In summary, one aspect of the invention provides a method of collecting and managing error messages, the method comprising the steps of: accepting error messages from different sources; discerning relationships between errors associated with the error messages; and communicating information on the error messages to at least one selected target, inclusive of information relating to at least one relationship between errors associated with the error messages.

Another aspect of the invention provides an apparatus for collecting and managing error messages, the apparatus comprising: an arrangement for accepting error messages from different sources; an arrangement for discerning relationships between errors associated with the error messages; and an arrangement for communicating information on the error messages to at least one selected target, inclusive of information relating to at least one relationship between errors associated with the error messages.

Furthermore, an additional aspect of the invention provides a program storage device readable by machine, tangibly embodying a program of instructions executable by the machine to perform method steps for collecting and managing error messages, the method comprising the steps of: accepting error messages from different sources; discerning relationships between errors associated with the error messages; communicating information on the error messages to at least one selected target, inclusive of information relating to at least one relationship between errors associated with the error messages.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Broadly contemplated herein are a method and apparatus for determining package dependency by one or more programming tools, either within or outside of a program development environment. In preferred embodiments, the programming tools are included within a programming environment, and include common program development tools, such as but not restricted to, compiler, linkers, library managers, debuggers, and program editors.

Figure 1:
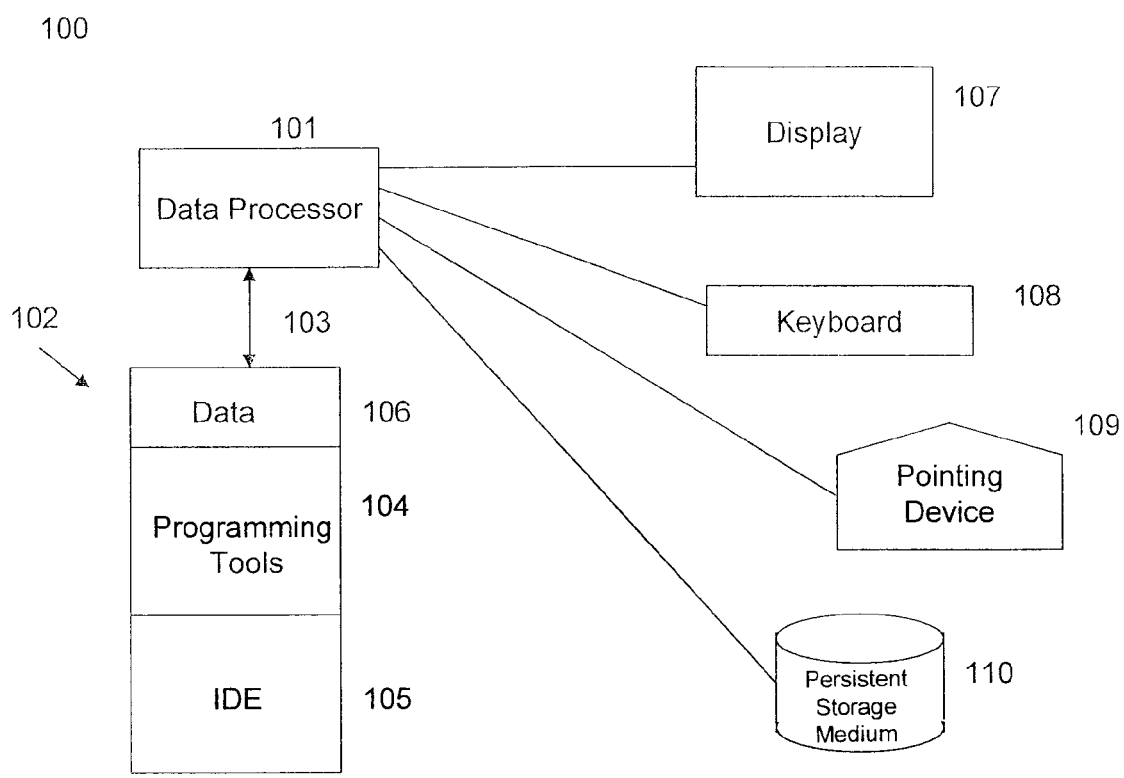
FIG. 1 depicts a block diagram of a data processing system.

Referring now to the drawings, and more particularly to FIG. 1, there is shown a block diagram of a data processing system 100 for program development of the present invention, as described above. In preferred embodiments, the data processing system 100 is an IBM Intellistation computer ("IBM" and "INTELLISTATION" are both registered trademarks of the International Business Machines Corporation). However, other data processing systems 100 are also contemplated for use by the present invention. For example, one can use a plurality of separate electronic circuits or devices (e.g., hardwired electronic or logic circuits, or programmable logic devices such as PLDs, PLAs, PALs, or the like). A suitable programmed general, purpose computer, e.g., a microprocessor, microcontroller or other processor device (CPU or MPU), either alone or in conjunction with one or more peripherals (e.g. integrated circuit) data and signal processing devices can be used. In general, any device or assembly of devices on which a finite state machine capable of implementing the flow charts shown in the figures can be used as a controller in accordance with the embodiments of the present invention.

Referring again to FIG. 1, the data processing system 100 may preferably comprise a data processor 101 having a memory 102. The memory 102 is coupled to the data processor 101 via a bidirectional bus 103. In preferred embodiments, the memory 102 includes program and data memory. The memory also includes program development tools 104, compilers, linkers, and library managers. It may also contain an integrated program development environment IDE 105, which can invoke the program development tools 104. The memory 102 also contains data memory 106, specifically data and objects related to the execution of the program development tools 104 and the IDE 105.

The IDE 105 presents information to the user on display 107, which is coupled to the data processor 101. In at least one preferred embodiment, a user data entry device 108 (e.g. keyboard or other interactive device), and a pointing device 109, for example, a mouse or a trackball, are also coupled to the data processor 101.

In a preferred embodiment, the display 107 provides a presentation space for the IDE in order to display the pieces of a program being constructed. In further embodiments, either the pointing device 108 or predefined keys of the data entry device 109 may be used to manipulate the data in conformity with aspects of the present invention.

It is also contemplated that a persistent storage mechanism 110 may preferably exist and be utilized to store IDE and program piece information 106. This type of storage media may include, but is not limited to, standard disk drive technology, tape, or flash memory. In a preferred embodiment, the program information 106 may be both stored onto the persistent media, and/or retrieved by similar processing system 100 for execution.

Figure 2:
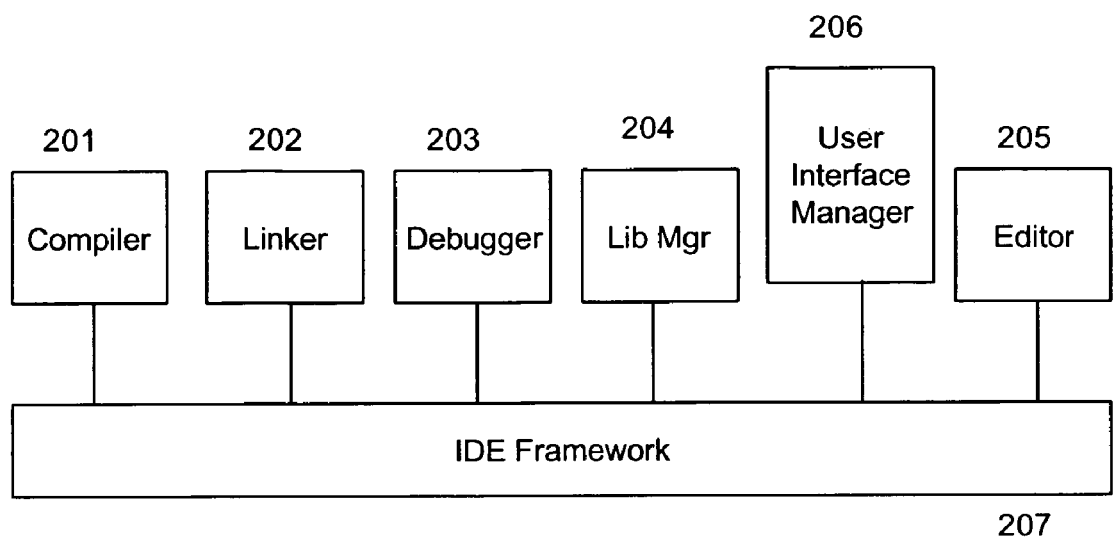
FIG. 2 depicts a block diagram of a program development environment, relating different components of that environment, and including programming tools executed by the environment.

In FIG. 2 there is shown an overview 200 of the components of an interactive program development program, in accordance with a preferred embodiment. The environment shows a set of commonly recognized program development tools, such as but not limited to, a compiler 201, a linker 202, a debugger 203, and a program library manager 204. There is also shown a program editor 205, typically used as a processor for source code entry, but not restricted to that purpose. There is also a user interface manager 206 which coordinates different views on program artifacts such as source views, project views, and the like. There is also an IDE framework component 207 which is a process which integrates the entire above mentioned components, coordinating their executions and collecting their outputs. The IDE framework provides other functions such as program project management, file management, and sequences user activity.

Figure 3:
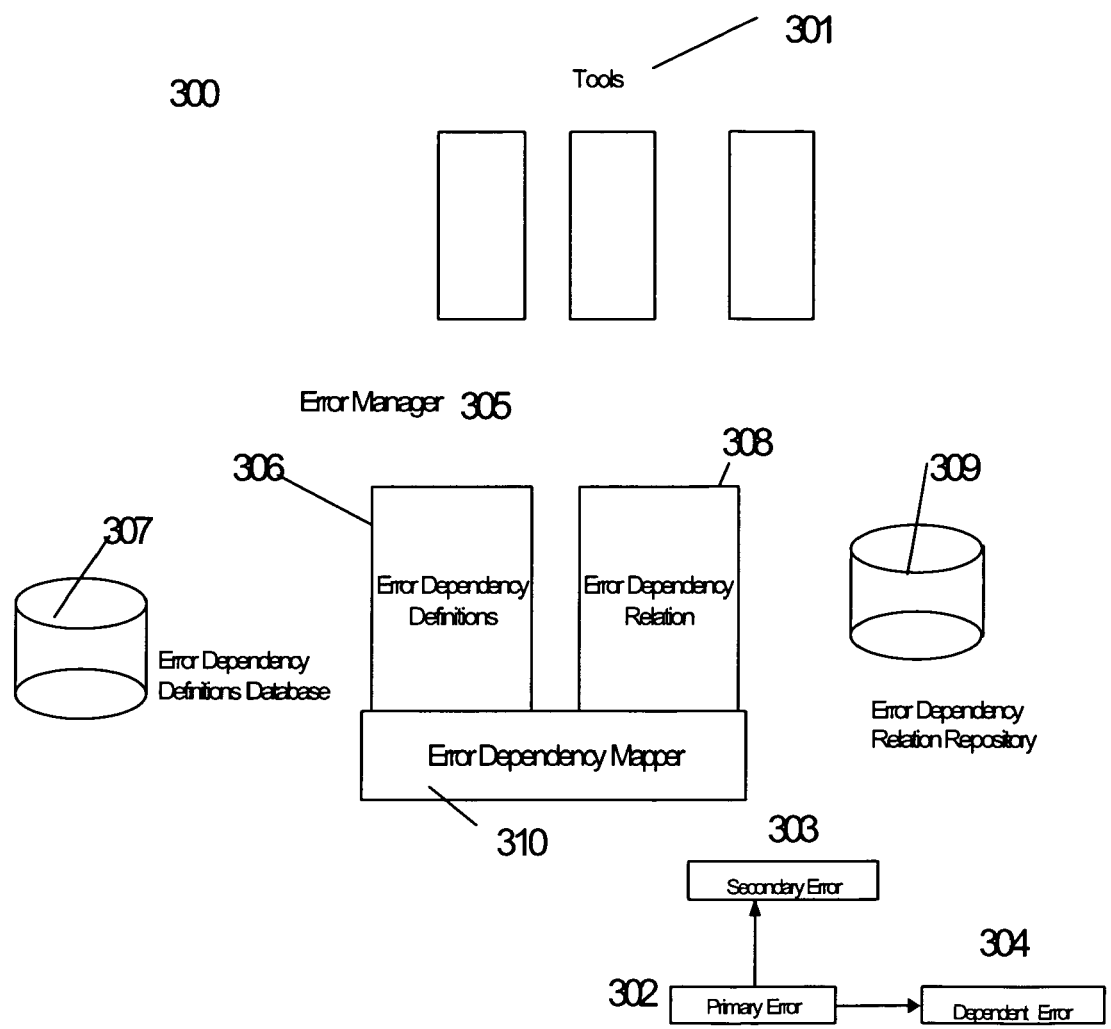
FIG. 3 depicts a block diagram showing tool component architecture, and additionally a error manager and plug-in components.

In FIG. 3 there is shown an overview 300 of the software components and related data of a typical tool found in an interactive program development program 200, as it relates to a preferred embodiment. Preferably provided is a set of program development tools 301. By way of example only, such tools include compilers, linkers, program analyzers, etc.

By the term primary error what is generally meant is an error which needs to be directly remedied. By the term secondary error what is generally meant is an error which can be traced back to some primary error, and once the primary error is fixed the secondary error will also be fixed automatically. By the term dependent error what is meant is an error which also can be traced back to a primary error; however, unlike the secondary error, it does not get fixed automatically when the corresponding primary error is fixed. To the extent that a dependent error needs an independent remedy of its own, there is shown in FIG. 3 a data schema for a relationship among primary, secondary, and dependent errors. A primary error 302 may have a set of secondary errors 303, and another set of dependent errors 304. This is a simple directed acyclic graph relationship as is typically implemented as program graphs, familiar to those of ordinary skill in the art.

With regard to error information, details like temporal data (e.g. timestamps), process identifier of the process which generated the error (in case of system tool invoking multiple processes), pass number (in case of system tool making multiple passes over input), etc, are collected for individual errors depending on the nature of the system tool. Errors may be classified as a tuple of the sort <error string, list of parameters>. Error identification information includes an error number, which identifies the specific error at hand and is often defined in a table by the system tool. The remaining parameters may be tool given, or obtained from the OS (operating system) environment (e.g., flag settings, environment variable settings, tool return value).

The value returned by a Unix tool may follow standard Unix conventions, return value indicating exit status, (which is 0 for successful return, and otherwise indicating error numbers in a typical range of 1-255) or a Unix tool may assign a value to global system variable "errno" to indicate the kind of error that occurred (see [http://]www.delorie.com/gnu/docs/glibc/libc_559.html and also errno.h for standard error codes in the context of signals and interrupts. A discussion of errno.h may be found in IEEE Std 1003.1-2001, [http://]www.opengroup.org/onlinepubs/009695399/basedefs/errno.h.html). The stderr terminal may be intercepted to catch error strings, which in the case of well-interfaced tools (to our middleware), would be straightforward (individual errors would be given to the tool, as per proper formats). Other tools, require parsing error cascades from the intercepted stderr, for arriving at error sequence interpretations (i.e., each error will potentially match different error formats so the right error format from among multiple candidates would have to be identified). Once an error sequence has been interpreted, the causal error (usually the first one) can be reported in a more meaningful manner.

Preferably provided is a software component called the error manager 305, whose function is to create the relationships among a given set of errors, by classifying them into primary, secondary, and dependent errors and creating the appropriate links between them. For this purpose, the error manager utilizes the error dependency definition 306 which includes the data that provides the definitions of relationships between various error classes. The information need not necessarily be restricted to reside in computer memory and, in fact, could embrace other storage arrangements including, for example disk, flash memory, or any distributed memory means. In that sense, and by way of illustrative example only, there could be a persistent repository 307 of the error dependency definition database. The error manager component produces an error dependency relation 308, which contains the relationships among various errors. This allows the error relation to be stored in the computer memory as well as a repository 308 on any persistent storage. There is also preferably an error dependency mapper 309 whose purpose is to process errors from client tools.

Figure 4:
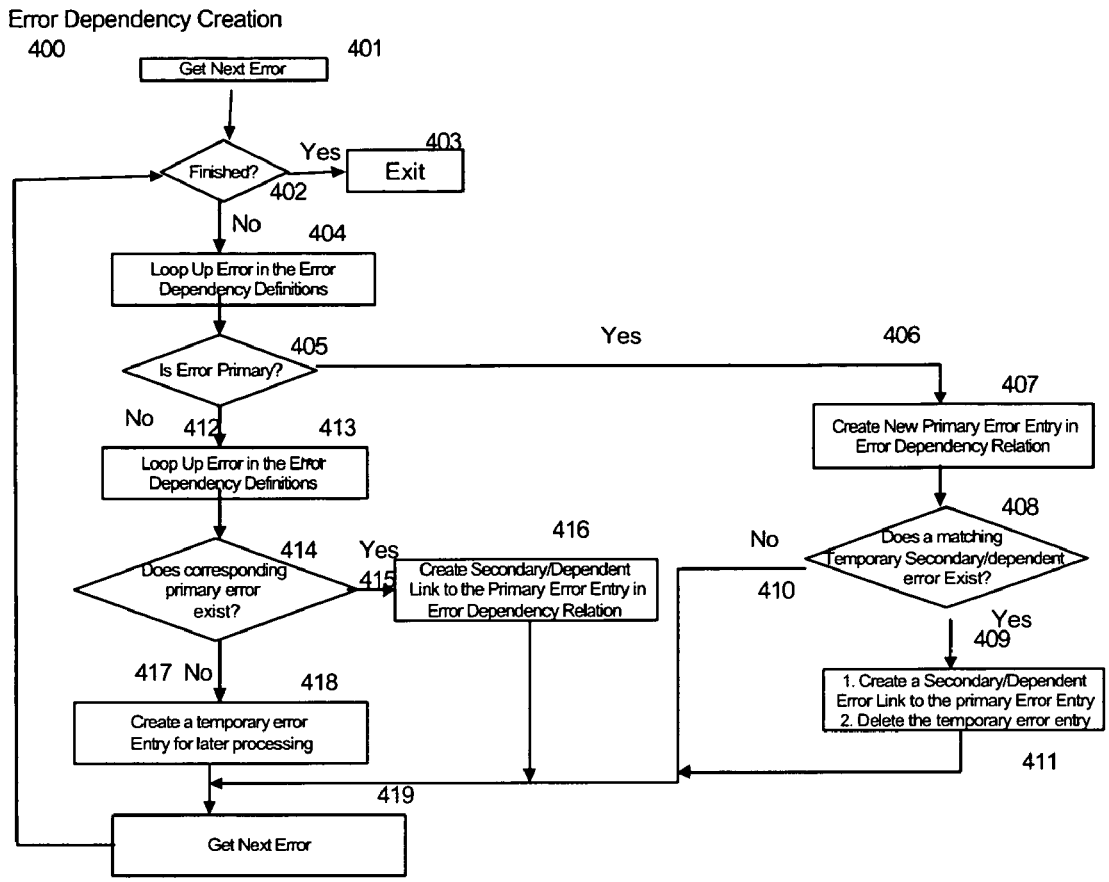
FIG. 4 depicts a block diagram showing the logic for populating the error dependency repository.

FIG. 4 outlines the logic for populating the error dependency relationship. During the error dependency creation phase 400, the first error message is acquired 401. If one is finished (402) with getting error messages, then one preferably simply exits (403) the process. Otherwise, the error dependency definitions are looked up to find the error message 404. If the current error message is a primary error 405, a new primary error entry is created (407). Also, if any temporary secondary or dependent errors which have not been associated with a primary error, but match with this primary error exist in a temporary location (408), they are associated with this primary error, and deleted from the temporary storage (409). The next error message is acquired for processing (411) after this or if there are no temporary errors associated to this primary error (410).

If the current error is not a primary error (412), a corresponding primary error is looked up (413). If such a primary error is found (415), the current error is linked as a secondary or dependent error appropriately to this primary error (416). If a primary error is not found (417), a temporary error entry is created (418). The next error message is retrieved for processing (419); with a return to error processing step 402.

The concepts discussed herein may easily be extended in fairly clear ways. For example, the error model discussed in FIG. 3 can be extended to include different kinds of relationships between errors based on their parameters, and may be formulated as rules. Based on the rules, existence of relationships between errors, as specified by the rules and thereby exposed by the system, may be presented to the user according to allow selection of relationship to interactive exploration. Also, and by example only, in case of system tool invoking multiple processes, errors generated would be interleaved and sorting them out would be hard. On basis of their process identifier, the errors can be categorized per process and this could be very useful.

Another conceivable variation would be in addressing the ongoing issue of fixing some errors in program code and unknowingly creating new errors. These new errors, along with previous errors would be reported in the next compilation. The programming practitioner would conceivably want to solve previous errors first and then concentrate on the new errors. Consequently, one may classify errors into previous errors and new errors. To do this manually would be quite tedious; hence, automatic support for this task would be quite desirable. A basic sketch for classifying errors as such (as recently introduced errors vs. continuing ones) can preferably include the following:

(a). Differentiate changed and unchanged regions of the current program version vis-à-vis the previous version. The diff utility, version control system, or other text differencing tool can be used for this purpose. A general discussion of a typical diff utility may be found at [http://]www.extropia.com/tutorials/unix/diff.html (b). Retain all primary errors derived from the unchanged region, i.e. those not secondary nor dependent to any other error as continuing errors (c). Report all secondary and dependent errors in the unchanged region as continuing errors, if all errors, to which they are secondary or dependent are in unchanged regions. Of course, "secondary and dependent" can involve secondary or dependent through levels of ancestry, and not just direct relationships.

(d) Process new errors as before.

It is to be understood that the present invention, in accordance with at least one presently preferred embodiment, includes an arrangement for accepting error messages from different sources, an arrangement for discerning relationships between errors associated with the error messages, and an arrangement for communicating information on the error messages to at least one selected target. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method, said method comprising:
  collecting and managing primary and secondary and dependent error messages, which comprises the steps of:
  accepting error messages from different sources, wherein said accepting step comprises representing error messages in the form of a directed acyclic graph involving nodes representing error messages and edges representing at least one relationship between the error messages;
  discerning relationships between errors associated with the error messages such that at least one primary error which causes a secondary or dependent error is identified; and
  communicating the error messages to at least one selected target, wherein the relationship of the at least one primary error to the secondary or dependent errors associated with the error messages is identified.

2. The method according to claim 1, wherein said discerning step comprises discerning at least one dependency relationship between errors associated with the error messages.

3. The method according to claim 2, wherein said discerning step comprises discerning at least one relationship wherein a secondary error is a causal result of a primary error, and the secondary error is resolved upon resolution of the primary error.

4. The method according to claim 3, wherein said discerning step comprises discerning at least one relationship wherein a dependent error is a causal result of a primary error, and the dependent error is not fully resolved upon resolution of the primary error.

5. The method according to claim 1, wherein said discerning step comprises distinguishing between the following with respect to a current version and a new version of a source of errors:
  errors which appear in the prior version and persist in the current version; and
  new errors which appear solely in the new version.

6. The method according to claim 1, wherein said discerning step comprises specifying relationships between errors via a set of at least one rule.

7. An apparatus comprising:
  an arrangement which collects and manages primary and secondary and dependent error messages, which comprises:
  an arrangement for accepting error messages from different sources, wherein said accepting arrangement is adapted to represent error messages in the form of a directed acyclic graph involving nodes representing error messages and edges representing at least one relationship between the error messages;
  an arrangement for discerning relationships between errors associated with the error messages such that at least on primary error which causes a secondary or dependent error is identified; and
  an arrangement for communicating the error messages to at least one selected target, wherein the relationship of the at least one primary error to the secondary or dependent errors associated with the error messages is identified.

8. The apparatus according to claim 7, wherein said discerning arrangement is adapted to discern at least one dependency relationship between errors associated with the error messages.

9. The apparatus according to claim 8, wherein said discerning arrangement is adapted to discern at least one relationship wherein a secondary error is a causal result of a primary error, and the secondary error is resolved upon resolution of the primary error.

10. The apparatus according to claim 9, wherein said discerning arrangement is adapted to discern at least one relationship wherein a dependent error is a causal result of a primary error, and the dependent error is not fully resolved upon resolution of the primary error.

11. The apparatus according to claim 7, wherein said discerning arrangement is adapted to distinguish between the following with respect to a current version and a new version of a source of errors:
  errors which appear in the prior version and persist in the current version; and
  new errors which appear solely in the new version.

12. The apparatus according to claim 7, wherein said discerning arrangement is adapted to specify relationships between errors via a set of at least one rule.

13. A computer program storage device medium readable by a computer processor machine, tangibly embodying an encoded program of instructions being executed by the machine to perform method steps said method comprising:
  collecting an managing primary and secondary and dependent error messages, which comprises the steps of:
  accepting error messages from different sources, wherein said accepting step comprises representing error messages in the form of a directed acyclic graph involving nodes representing error messages and edges representing at least one relationship between the error messages;
  discerning relationships between errors associated with the error messages such that at least one primary error which causes a secondary or dependent error is identified; and
  communicating the error messages to at least one selected target, wherein the relationship of the at least one primary error to the secondary or dependent errors associated with the error messages is identified.

* * * * *